Feb. 27, 1940.    V. VALLETTA    2,191,599
MEANS FOR COOLING THE RADIATOR OF A MOTOR VEHICLE ENGINE
Filed July 12, 1939
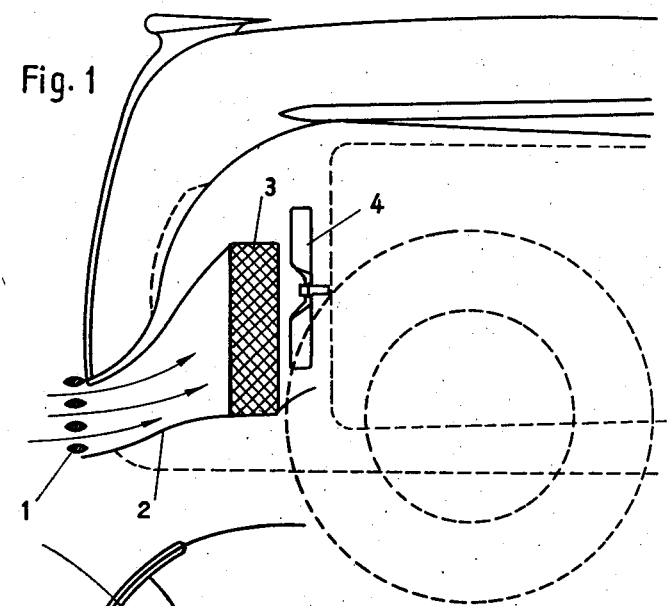
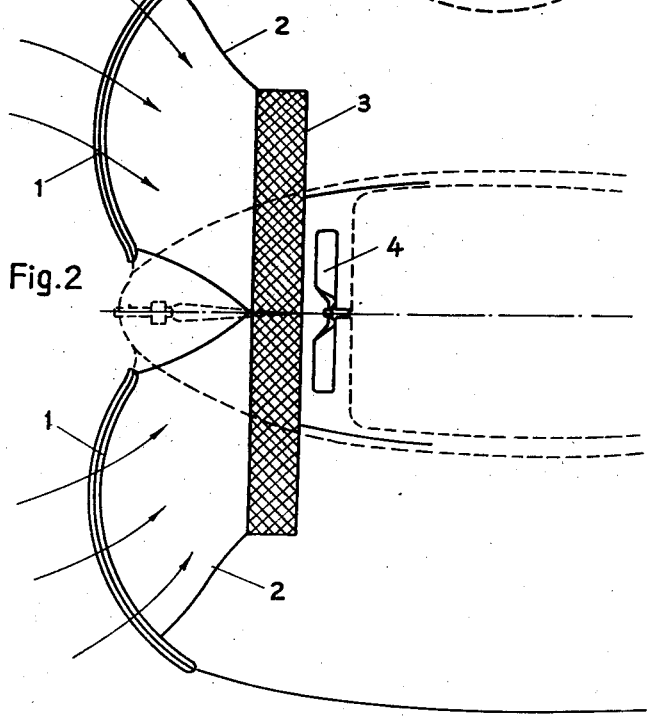
INVENTOR,
VITTORIO VALLETTA Patented Feb. 27, 1940

2,191,599

UNITED STATES PATENT OFFICE 2,191,599

MEANS FOR COOLING THE RADIATOR OF A MOTOR VEHICLE ENGINE

Vittorio Valletta, Turin, Italy, assignor to Fiat Societa Anonima, Turin, Italy

Application July 12, 1939, Serial No. 284,110
In Italy March 21, 1939

2 Claims. (Cl. 180—54)

This invention provides new and improved means for cooling the radiator of a motor vehicle engine.

The said means is characterized in that the elements of a front bumper form admission openings through which air is conveyed to the radiator, the engine bonnet and the front mudguards presenting a non-apertured frontal hood portion enclosing the radiator.

This arrangement permits of obtaining, in addition to a nicer appearance of the vehicle, a higher streamline efficiency of its front part owing to its continuous surfaces. Moreover, a strengthening of the front part of the body is obtained in view of the better assembling of its sides.

Preferably, the bonnet and mudguards include the walls of a duct conveying the cooling air to the radiator, and the latter is made wide and limited in height and set low so as to minimize deviation of the cooling air.

The radiator may be made in one piece or of plurality of sections, and there may be associated therewith a fan or fans arranged, as usual, to increase the flow and therefore the volume of air passing through the radiator. When the vehicle is in motion a current of air through the radiator is naturally created, and the or each fan serves chiefly to make up for a decrease of this naturally created air current when hill climbing.

The annexed drawing shows diagrammatically and by way of example one embodiment of the invention.

Fig. 1 is a fragmentary vertical section of the front part of a motor vehicle, and Fig. 2 is a fragmentary horizontal section thereof.

As will be clearly seen from the drawing, the engine bonnet is fully closed at its front part and is not provided with any grille or like opening for admission of the air necessary for cooling the radiator. The whole front part of the bonnet and the front mudguards present a fully continuous surface adapted to confer to the vehicle a higher resistance to mechanical stresses and a streamline form and therefore a higher aerodynamic efficiency. A front bumper is constituted of spaced elements 1 which form admission openings through which air is conveyed to the radiator 3. The engine bonnet and mudguards include the walls of a duct 2 conveying the air so admitted to the radiator. The latter is preferably made wide and limited in height and set low so as to minimize deviation of the cooling air.

4 denotes the usual fan.

Obviously the form and constructional details of the front bumper 1 and the form and arrangement of the radiator may be varied without departing from the scope of the invention.

What I claim is:

1. In a motor vehicle, a radiator, an engine bonnet and front mudguards presenting a non-apertured frontal portion enclosing the radiator, and a front bumper under said front portion of the mudguards provided with openings through which air is conveyed to the radiator.

2. In a motor vehicle, a radiator, which is made wide and limited in height and set low so as to minimize deviation of the cooling air for said radiator, an engine bonnet and front mudguards presenting a non-apertured frontal portion enclosing the radiator, a front bumper under said frontal portion of the mudguards constituted of spaced elements which form air admission openings, and side walls in said frontal portion of the mudguards forming a duct conveying the air so admitted to the radiator.

VITTORIO VALLETTA.